United States Patent [19]

Horn et al.

[11] Patent Number: 4,764,537
[45] Date of Patent: Aug. 16, 1988

[54] INTERNAL MOLD RELEASE AGENTS, THEIR USE FOR PREPARING MOLDED ARTICLES USING POLYISOCYANATE-ADDITION POLYMERIZATION, AND A PROCESS FOR PREPARING MOLDED ARTICLES

[75] Inventors: Peter Horn, Hedelberg; Hans U. Schmidt, Ludwigshafen, both of Fed. Rep. of Germany

[73] Assignee: BASF Aktiengesellschaft, Ludwigshafen, Fed. Rep. of Germany

[21] Appl. No.: 96,957

[22] Filed: Sep. 15, 1987

[30] Foreign Application Priority Data

Sep. 19, 1986 [DE] Fed. Rep. of Germany ....... 3631842

[51] Int. Cl.$^4$ ............................................. C08G 18/14
[52] U.S. Cl. .................... 521/51; 106/38.22; 264/51; 521/118; 521/121; 521/124; 521/125; 521/128; 521/129; 524/714; 524/717; 524/718; 524/719; 524/720; 524/722; 524/723; 524/724; 528/49; 528/52

[58] Field of Search .......................... 252/182; 264/51; 521/51, 118, 121, 124, 125, 128, 129; 524/714, 717, 718, 719, 720, 722, 723, 724; 528/49, 52

[56] References Cited

U.S. PATENT DOCUMENTS 4,519,965 5/1985 Taylor et al. ......................... 528/55

Primary Examiner—Maurice J. Welsh
Attorney, Agent, or Firm—John C. Demeter

[57] ABSTRACT

Disclosed are internal mold release agents for the preparation of molded articles using polyisocyanate addition polymerization, which are comprised of:

(A) at least one ketimine, aldimine, enamine, cyclic Schiff base or a mixture of at least two of said compounds;
(B) at least one metal salt of an organic carboxylic acid having from 8 to 24 carbon atoms; and
(C) optionally including at least one carboxylic acid, organic sulphonic acid, mineral acid, or amidosulphonic acid, and their use in preparing molded articles comprised of polyurethane-plastics, polyurea-plastics, polyurethane-polyurea-plastics, polyurethane-polyurea-polyamide-plastics, or polyurea-polyamide-plastics.

17 Claims, No Drawings

INTERNAL MOLD RELEASE AGENTS, THEIR USE FOR PREPARING MOLDED ARTICLES USING POLYISOCYANATE-ADDITION POLYMERIZATION, AND A PROCESS FOR PREPARING MOLDED ARTICLES

BACKGROUND OF THE INVENTION

1. Field of the Invention

The present invention generally relates to elastomeric molded articles, and more particularly to internal mold release agents for use in the preparation of cellular or noncellular molded articles from polyurethane, polyurea, polyurethane-polyurea, polyurethane-polyurea-polyamide, or polyurea-polyamide elastomers using polyisocyanate addition polymerization.

2. Description of the Relevant Art

The preparation of cellular or noncellular molded articles from polyurethane elastomers, polyurea elastomers, polyurethane-polyurea-elastomers, polyurethane-polyurea-polyamide-elastomers, or polyurea-polyamide elastomers, in open or preferably in closed molds using the polyisocyanate addition polymerization process, particularly by means of ordinary RIM, is the subject of numerous patent and literature publications. An example is Federal Republic of Germany Pat. No. 26 22 951 (U.S. Pat. No. 4,218,543), in which polyurethane-polyurea elastomers are described, which essentially are comprised of organic polyisocyanates, higher molecular weight polyhydroxyl compounds, reactive aromatic di- and/or polyamines, which are substituted by alkyl groups in the ortho position relative to the amino groups, and strong catalysts are used for the reaction between the hydroxyl groups and isocyanate groups. Although the extremely rapid reaction between these basic components has been claimed to eliminate the need to use release agents to demold the molded articles from polished metal molds, it is known to use release agents based on wax or silicon as well as those internal release agents cited in Federal Republic of Germany, Pat. No. 19 53 637 (U.S. Pat. No. 3,726,952) or in Federal Republic of Germany Pat. No. 21 670 (Great Britain Pat. No. 1,365,215).

A further example of such release agents is Federal Republic of Germany Pat. No. 19 53 637 which discloses salts of aliphatic mono- or polycarboxylic acids having at least 25 carbon atoms, and primary mono-, di-, or polyamines having two or more carbon atoms, or amide or ester group-containing amines, which have at least one primary, secondary or tertiary amino group. Federal Republic of Germany Pat. No. 21 21 670 discloses a mixture of at least two compounds from the group of amine-carboxylic acid-salts according to Federal Republic of Germany Pat. No. 19 53 637, which discloses saturated or unsaturated COOH— and/or OH group-containing esters from mono- and/or polycarboxylic acids, and multivalent alcohols or natural and-/or synthetic oils, fats or waxes as internal release agents. However even when using these mold release agents in formulations containing primary aromatic diamines for the preparation of polyurethane-polyurea-elastomers using RIM, generally only a slight improvement in the self releasing properties is achieved. When using release agents containing acid groups, particularly carboxyl groups, a further disadvantage is that catalysis of the highly reactive formulations is disrupted and in turn the molded articles are produced without sufficient green strength.

To avoid the disadvantage of insufficient green strength, European Patent Application No. 81 701 (Australian Pat. No. 82/90150) uses polyoxyalkylene-polyamines in place of the higher molecular weight polyhydroxyl compounds, whereby said reactive groups in relation to the polyisocyanate is comprised of at least 50 percent of primary and/or secondary amino groups. In this way, the use of external release agents is said to be avoided. However, using expensive polyoxyalkylenepolyamines not only increases the cost of the resulting molded articles, but it also limits their general application because of the resulting change in their physical properties.

An improvement in the self-releasing properties in the preparation of polyurethane-polyurea molded articles using RIM technology is said to be achieved by using carboxylic esters and/or carboxylic amides, prepared by the esterification or amination of a mixture comprised of montanic acid and at least one aliphatic carboxylic acid having at least 10 carbon atoms with at least difunctional alkanolamines, polyols and/or polyamines having molecular weights of from 60 to 400, as internal mold release agents according to the disclosure of European Patent Application No. 153 639.

European Patent Application No. 180 749 (Australia No. 85/47498) discloses a condensation product from 3 to 15 moles of ricinoleic acid and 1 mole of a mono or multivalent alcohol, which contains ester groups being used as an internal release agent; and which has an average molecular weight of from 900 to 4500, an acid number below 5 and a hydroxyl number of 12.5 to 125.

European Patent Application No. 173 888 (U.S. Pat. No. 4,519,965) discloses an internal mold release agent for use in RIM technology of mixtures comprised of a zinc carboxylate having from 8 to 24 carbon atoms in the carboxyl radical and polymers containing nitrogen reacting with the isocyanate groups, for improving the compatibility of the zinc carboxylate with the initial components in the preparation of polyurethane-polyurea molded articles.

Described in Patent Cooperation Treaty Patent Application No. WO 84/03288 (European Patent Application No. 01 19 471) is an internal release agent mixture comprised of at least one compound containing primary and/or secondary amino groups, with reactive hydrogen atoms and at least one metal salt of a carboxyl acid, phosphoric acid or boric acid in a weight ratio of at least 2:1. A disadvantage of these mixtures is their strong influence on the reactivity, for example the cream time. The formulations react so quickly that in a majority of the cases the mold is not able to be completely filled, particularly molds having a complicated design. The amino group-containing compounds, in addition, can act as chain disrupters and if lower molecular weight substances are present they can lead to annoying odors.

According to Patent Cooperation Treaty Patent Application WO No. 86/01215, tertiary amines are used in similarly composed mold release agent mixtures, which, however, have a tendency to bleed out of the molded article and negatively influence the molded articles' ability to be painted. The tertiary amines in addition, due to their catalytic effect, can lead to secondary reactions, for example, isocyanurization, and with cellular molded articles they lead to an undesirable nonhomogeneous cell structure. In turn, they cannot be used in just any quantity. Even in these formulations the cream time is in many cases too rapid.

Although using the above-described methods, the demolding properties of polyurethane-polyurea molded articles can be improved depending on the composition of the system, there remains a need for further improvement in said demolding properties.

Also known is the preparation of molded articles having a cellular core and a dense peripheral zone by the reaction of organic polyisocyanates, higher molecular weight compounds having at least two reactive hydrogen atoms and optionally including chain extending agents, in the presence of blowing agents, preferably physically effective blowing agents, catalysts, additives and/or auxiliaries, in closed, optionally temperature controlled molds: disclosed for example in Federal Republic of Germany Pat. No. 16 94 138 (Great Britain Pat. No. 1,209,243); Federal Republic of Germany Pat. No. 19 55 891 (Great Britain Pat. No. 1,321,679); and Federal Republic of Germany Pat. No. 17 69 886 (U.S. Pat. No. 3,824,199); and polyurethane-polyurea-polyamide-molded articles and polyureapolyamide molded articles prepared using the RIM process, for example according to U.S. Pat. No. 4,552,945.

Disclosed in Federal Rebulic of Germany Application No. 3535 711 (U.S. application Ser. No. 907,829 filed Sept. 16, 1986) are internal mold release agents for the preparation of molded articles using the polyisocyanate addition polymerization process comprised of
(A) a mixture of
(i) 5 to 80 parts by weight of at least one organic amine and/or cyclic lactam,
(ii) 20 to 95 parts by weight of at least one metal salt of stearic and/or isostearic acid, and
(iii) 0 to 5 parts by weight of a metal salt of an organic mono- and/or dicarboxylic acid, and
(B) 0.1 to 200 weight percent, based on the weight of the entire mixture A, of at least one organic mono- and/or dicarboxylic acid or their anhydrides.

By using this internal mold release agent in combination with aromatic diamines as chain extenders, cellular or noncellular polyurea molded articles and polyurethane-polyurea molded articles are able to be prepared without problems following the procedures in Federal Rebulic of Germany Application No. 3535 711 in experimental trials where more than 30 molded articles are made. Following Federal Republic of Germany Application No. 3607 447 (U.S. patent application Ser. No. 018,188, filed 2/25/87), also in experimental trials, more than 30 molded articles are prepared without problems using this internal release agent where the polyurethane molded articles so prepared have a cellular core and a dense peripheral zone.

Although the use of the aforesaid internal mold release agent is clearly able to improve the number of demoldings in the preparation of molded articles using the polyisocyanate addition polymerization process, a definite impairment in the cream time with individual formulations cannot be completely ruled out.

The object of the present discovery was to develop internal mold release agents for the preparation of cellular or noncellular molded articles in open or preferably closed molds using the polyisocyanate addition polymerization process, preferably by means of RIM technology, which will overcome all or at least some of the aforesaid disadvantages, and contribute to a further improvement in the series production of molded articles in large numbers.

This objective was surprisingly met by using ketimines, aldimines, enamines or cyclic Schiff bases in the preparation of the internal mold release agent.

SUMMARY OF THE INVENTION

The subject of the present discovery is internal mold release agents for the preparation of molded articles using the polyisocyanate addition polymerization process which are comprised of
(A) at least one ketimine, aldimine, enamine, cyclic Schiff base or a mixture of at least two of said compounds; and
(B) at least one metal salt of an organic carboxylic acid having from 8 to 24 carbon atoms; and
(C) optionally including at least one organic carboxylic acid, organic sulfonic acid, mineral acid or amidosulfonic acid.

Preferably used are internal mold release agents for the preparation of molded articles using the polyisocyanate addition polymerization process which are comprised of
(A) from about 5 to about 90 parts by weight, preferably from about 20 to about 80 parts by weight, of at least one ketimine, aldimine, enamine or cyclic Schiff base or a mixture of at least two of said compounds,
(B) from about 10 to about 95 parts by weight, preferably from about 30 to about 85 parts by weight, of at least one metal salt of an organic carboxylic acid having from 8 to 24 carbon atoms, and
(C) 0 to about 50 parts by weight, preferably 0 to about 30 parts by weight, of at least one organic carboxlyic acid, organic sulphonic acid, mineral acid or amidosulphonic acid, based on 100 parts by weight of the initial components A and B.

The subject of the present invention is also using said internal mold release agents for the preparation of noncellular or cellular molded articles, or molded articles having a cellular core and a dense peripheral zone using the polyisocyanate addition polymerization process, preferably using RIM technology, and a process for the preparation of cellular or noncellular molded articles having a cellular core and dense peripheral zone having improved demolding properties using the polyisocyanate addition polymerization process, preferably using RIM technology, through the reaction of
(a) organic polyisocyanates;
(b) higher molecular weight compounds having at least 2 reactive hydrogen atoms;
(c) chain extending agents and/or cross linkers in the presence of
(e) an internal mold release agent; and
(f) catalysts; and optionally in the presence of
(g) blowing agents; and
(h) auxiliaries and/or additives
in open or preferably closed molds, wherein said internal mold release agent (e) is a mixture comprised of
(A) from about 5 to about 90 parts by weight, preferably from about 20 to about 80 parts by weight, of at least one ketimine, aldimine, enamine, cyclic Schiff base or a mixture of at least two of said compounds,
(B) from about 10 to about 95 parts by weight, preferably from about 30 to about 85 parts by weight, of at least one metal salt of an organic carboxylic acid having from 8 to 24 carbon atoms; and
(C) from 0 to about 50 parts by weight, preferably from 0 to about 30 parts by weight and most preferably from 0 to about 25 parts by weight, of at least one organic carboxylic acid, organic sulfonic acid, mineral acid or amidosulfonic acid, based on 100 parts by weight of the initial components (A) and (B).

DESCRIPTION OF PREFERRED EMBODIMENTS

The internal mold release agent (e) is used for the preparation of molded articles, generally in an amount of from 0.1 to 15 parts by weight, preferably from 2 to 10 parts by weight, based on 100 parts by weight of initial components (b) and (c).

The following should be noted with respect to the components used in preparing the internal mold release agents.

As already stated, ketimines, aldimines, enamines or cyclic Schiff bases are used as initial components A. These compounds can be employed individually or in the form of mixtures in or among the individual classes of compounds. Also suitable are mixtures of said compounds and soluble oligourethanes and/or oligoureas having molecular weights of from to 700, preferably of from 200 to 600 and having melting points of from 30° to 280° C., preferably of from 70° to 250° C.

The compounds suitable as ketimines and/or aldimines are prepared in an essentially conventional fashion through the action of:

optionally substituted or unsubstituted aliphatic, cycloaliphatic, heterocyclic and/or aromatic primary monoamines having from 1 to 20 carbon atoms and/or primary polyamines, preferably primary diamines, having from 2 to 20 carbon atoms;

optionally substituted or unsubstituted aliphatic, cycloaliphatic, heterocyclic and/or aromatic primary mono and/or polyamines, which additionally contain in bonded form secondary and/or tertiary amino groups and/or heterocyclic radicals and/or hydroxyl groups and/or ether groups; or linear, branched or cyclic alkanolamines having from 2 to 22 carbon atoms and/or polyoxyalkylene-polyamines having molecular weights from 204 to 5000;

with aromatic, aliphatic-aromatic, cycloaliphatic or aliphatic ketones and/or diketones or optionally substituted aliphatic and/or aromatic aldehydes, dialdehydes and/or acetals.

Examples of primary aliphatic monoamines having from 1 to 20 carbon atoms, preferably from 4 to 12 carbon atoms, are for example: methyl-, ethyl-, propyl-, isopropyl-, n-butyl-, iso-butyl-, sec.-butyl-, n-pentyl, iso-pentyl-, amyl-, 1,2-dimethyl-propyl-, n- and iso-hexyl-, 5-methyl-2-hexyl-, octyl-, 2-ethyl-hexyl-, 6-methyl-heptyl-2-, 2-ethyl-octyl-, decyl-, tridecyl-, dodecyl-, hexadecyl-, octadecyl- and stearylamines. The primary aliphatic amines are optionally substituted, with for example aryl, alkoxy, acetal radicals and/or bihalogen atoms. Examples of such primary amines are: 2-phenyl-ethyl-, 1-phenyl-ethyl-, benzyl-, o-methoxyphenyl-ethyl-, p-methoxyphenyl-ethyl-, 2-phenyl-propyl-, 1-methyl-3-phenylpropyl-, homoveratryl-, 2-methoxyethyl-, 2-ethoxyethyl-, 3-methoxypropyl-, 3-ethoxypropyl-, 3-(2-ethoxyhexoxy)-propyl-, 3-tridecyloxypropyl-, 3-stearyloxypropyl-, 1-methoxy-methylpropylamine, polyoxyalkylene monoamines, 2-amino-propion-aldehyde-dimethylacetal, 9-phenoxy-4,7-dioxanonane-1-amine and 3-[2(2-phenoxyethoxy)ethoxy]-1-propanamine.

Individual examples of primary cycloaliphatic amines are: cyclopropylmethyl-, cyclohexyl-, 1-cyclohexylethyl-, 2-methyl-cyclohexyl-, 1-ethinylcyclohexyl- and norbornylamine.

Individual examples of primary aromatic amines are: aniline, o-toluidine, 4-nitro-2-toluidine, 2,6-dichlor-4-nitroaniline and 2,6 dibromo-4-nitroaniline.

Examples of primary polyamines, preferably primary diamines, having from 2 to 20 carbon atoms, more preferably from 2 to 12 carbon atoms are: aliphatic diamines, such as ethylene, 1,2- and/or 1,3-propylene, 1,4-butylene, 1,5-pentamethylene, 1,6-hexamethylene, 1,10-decylene, 1,12-dodecylene and neopentylene diamine; cycloaliphatic diamines, such as 4,4'-diamino-dicyclohexylmethane, 4,4'-methylene-bis-(2-ethyl-6-methyl)-cyclohexylamine, 3,3'-dimethyl-4,4'-diamino-dicyclohexylmethane, (3-methyl-4-amino-cyclohexyl)-(3-methyl-4-aminophenyl)-methane; and aromatic polyamines, optionally substituted on the aryl radical by alkyl-, alkoxy-, nitro-, cyano groups and/or halogen atoms, such as, o-, m- and/or p-phenylene-diamine, 2,4- and/or 2,6-toluylene-diamine, toluidine-crude bases, 2,2'-, 2,4'- and/or 4,4'-diamino-diphenylmethane, polyphenyl-polymethylene polyamine, 3,3'-dimethyl-4,4'-diamino-diphenylmethane, 3,3'-dimethyl-4,4'-diaminodiphenylsulfone, 3,3'-dimethyl-4,4'-diamino-diphenylether and 3,5-diethyl-2,4- and/or 2,6-toluylenediamine.

Examples of optionally substituted aliphatic, cycloaliphatic, heterocyclic and/or aromatic primary monoamines and/or polyamines, having from 2 to 20 carbon atoms, preferably from 2 to 18 carbon atoms, which additionally contain in bonded form secondary and/or tertiary amino groups, heterocyclic radicals, hydroxyl groups and/or ether groups, are: diethylene-triamine, dipropylene-triamine, dihexamethylenetriamine, bis-(4-aminocyclohexyl)-amine, 2-dimethylaminoethylamine, 2-diethylaminoethylamine, 2-diisopropylaminoethylamine, 2-dibutylaminoethylamine, 4-diethylaminobutylamine, 1-diethylamino-4-aminopentane, dimethylaminoneopentylamine, 3-(2-ethylhexoxy)-propylamine, 3-(2-aminoethyl)aminoproylamine, N,N'-bis(3-aminopropyl)ethylenediamine, condensation products from diethylenetriamine, N-2-aminoethyl-ethanolamine, 2-amino2-ethoxyethanol, 4,7-dioxadecane-1,10-diamine, 4,9-dioxadodecane-1,12-diamine, 7-methyl-4,10-dioxatridecane-1,13-diamine, 4,7,10-trioxatridecane-1,13-diamine, 4,4'-diamino-dicyclohexylether, N,N'-bis(3-aminopropyl)-1,2-propylenediamine and/or 1,3-propylenediamine, 2-(1-pyrrolidyl)-ethylamine, 2-(1-piperidyl)ethylamine, 1-(2-aminoethyl)-morpholine, 4-(3-aminopropyl)morpholine, 2-(4-morpholinyl)-ethylamine, 1-(3-aminopropyl)imidazol, 1-(2-aminoethyl)-piperazine, 1,4-bis-(2-aminoethyl)piperazine, 1,4-bis(3-aminopropyl)-piperazine, tris-(aminoethyl)-amine and tris-(3-aminopropyl)-amine.

Some examples of linear, branched or cyclic alkanolamines having from 2 to 22 carbon atoms, preferably from 2 to 10 carbon atoms, are: ethanolamine, 3-propanolamine, 4-butanolamine, 2-aminobutanol-1, 2,2-dimethyl-3-aminopropanol-1, 4-methyl-4-aminopentanol-2, 2,2'-aminoethoxyethanol, N-aminoethyle-thanolamine, N-aminoethyl-isopropanolamine, 1-(2-hydroxyethyl)-piperidine, 1-(2-hydroxyethyl)-morpholine and 1-(2-hydroxyethyl)-piperazine.

Examples of polyoxyalkylene-polyamines having a molecular weight of from 204 to 5000, preferably of from 400 to 2000, are preferably those polyamines having primary or primary and secondary amino groups and having a functionality of from 1 to 6, preferably of from 2 to 4 and include: polyoxypropylenediamines, polyoxyethylene-diamines, polyoxypropylene-polyoxyethylene-diamines, polyoxypropylene-triamines, polyoxyethylenetriamines, polyoxypropylene-polyoxyethylene-triamines, polyoxypropylene-polyoxyethylene-tetra-amines and bis(3-aminopropyl)polyoxybutylene-ether having molecular weights up to 750. Also suitable are polyoxyalkylene-polyamines, which contain in bonded form up to 30 percent, preferably up to 15 percent, of terminally positioned primary and/or secondary hydroxyl groups.

The organic monoamines and/or polyamines can be employed individually or as mixtures from the same or from different compound classes.

The following organic mono- and/or polyamines are preferred: n-butylamine, n-pentylamine, n-hexylamine, n-octylamine, 1,3-propylene-diamine, 1,6-hexamethylene-diamine, dipropylene-triamine, 2,2-dimethyl-1,3-propylene-diamine and the toluidine crude bases.

For the preparation of the ketimines used according to the process of this invention, advantageously ketones are used having the formula $R^1—CO—R^2$ in which the organic radicals $R^1$ and $R^2$ are the same or different and are an aliphatic, cycloaliphatic or aromatic radical or both radicals together are a cycloaliphatic radical. The organic radicals $R^1$ and $R^2$ can optionally contain in bonded form olefinic unsaturated groups and/or substituents such as hydroxyl-, alkoxy-, tertiary amino-, cyano groups or halogen atoms. If such substituted ketones are used, then preferred are those whose radicals are inert under the reaction conditions used in preparing the ketimine. Preferably used are ketones which contain in bonded form aliphatic or mixed aliphatic and aromatic radicals. Individual examples of ketones and/or diketones are: acetone, methylethylketone, diethylketone, methylpropylketone, methylisopropylketone, methyl-n-butylketone, methylisobutylketone, ethylisopropylketone, methylisoamylketone, di-n-propylketone, diisopropylketone, cyclopentanone-, cyclohexanone, acetophenone, benzophenone, hydroxylacetone, methoxyacetone, di-(n-butylamino) acetone, 1-hydroxyl-butanone, 4-hydroxyl-butanone, 2-methyl-6-heptene-2-one, 2,5-hexanedione, phenylacetone, o-methoxyphenyl-acetone, p-methoxyphenylacetone, 4-phenyl-2-butanone, phenyl-1,2-propanedione, N,N,N',N'-tetramethyl-4,4'-diaminobenzophenone and 3,3,5-trimethylcyclohexanone. The ketones and/or diketones can be used individually or as mixtures. Preferably used are acetone, methylisobutylketone, cyclopentanone, cyclohexanone and phenylacetone and most preferably those ketones, which have a hydrogen atom in bonded form in the alpha position relative to the carbonyl groups, a boiling point below about 170° C. and/or are easily volatile with steam. The ketimines are prepared following known processes, such as those described by Houben-Weyl, *Methods of Organic Chemistry*, volume VI-2b, part II, Georg Thieme Publishers, Stuttgart, 1976, 4th Edition, pages 1948 and following, in the presence of inert solvents which also serve as an entraining agent for removing water and in the presence of small amounts of catalysts such as p-toluene sulfonic acid.

For the preparation of the aldimines of this invention, along with the above described primary amines, other starting compounds are used such as optionally substituted aliphatic and/or aromatic aldehydes, dialdehydes and/or acetals; preferably those aldehydes or acetals are used which have a hydrogen atom in bonded form in the the alpha position relative to the formyl groups and/or the acetal radical.

Typical examples of aldehydes, dialdehydes and/or acetals are: aliphatic aldehydes, such as acetaldehyde, propionaldehyde, n-butyraldehyde, iso-butyraldehyde, methoxyacetaldehyde, 2-acetoxy-propionaldehyde, n-valeraldehyde, isovaleraldehyde, pivalaldehyde, 2-methylbutanal, 3-methyl-2-butenal, 2-methylpentanal, 2-ethylhexanal, glyoxal, glutardialdehyde as well as the corresponding acetals, preferably dimethyl- or diethylacetals; and aromatic aldehydes for example benzaldehyde, 2-phenylpropanal, p-toluylaldehyde, 4-methoxybenzaldehyde, 4-dimethylaminobenzaldehyde, 4-diethylaminobenzaldehyde and terephthaldialdehyde. The aldehydes, dialdehydes and acetals can be used individually or as mixtures. Preferred are acetaldehyde, isobutyraldehyde and 2-phenylpropanal.

The aldimines are prepared using conventional methods, such as described in *Bull. Soc. Chim.*, 1947, pages 716 and following. A detailed description of suitable ketimines and aldimines was published in *Chemical Reviews No* 63, 1963, pages 489 and following.

In the preparation of the internal mold release agents, enamines and/or polyenamines can be used, which are prepared by the reaction of optionally substituted aliphatic, cycloaliphatic, heterocyclic and/or aromatic secondary monoamines and polyamines with aliphatic aldehydes or cyclicaliphatic ketones.

Examples of compounds used as secondary amines are those having the following formula:

$R^3$-NH-A-NH-$R^4$, in which $R^3$ and $R^4$ are the same or different aliphatic radicals having from 1 to 6 carbon atoms, preferably from 1 to 4 carbon atoms, or are cycloaliphatic radicals having from 5 to 6 carbon atoms, for example methyl-, ethyl-, n- or isopropyl-, n-, isoor sec.-butyl-, cyclopentyl- and cyclohexyl radicals; and A is an alkylene group having from 2 to 16 carbon atoms, a cycloalkylene group having from 5 to 20 carbon atoms, an arylene group having from 6 to 15 carbon atoms or a divalent polyoxyalkylene radical having a molecular weight of from 400 to 5000.

In addition, cyclic diamines having the formula

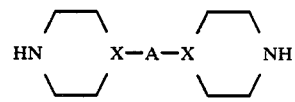

are suitable as secondary amines, in which A has the above described meaning, and X is a nitrogen atom or CH group, provided that when one or both X are a CH radical, then the X moieties can be bonded directly to each other and radical A deleted; and 1-position substituted derivatives thereof, preferably alkyl substitsted piperazines, such as 1-(2-hydroxylethyl) piperazine, and morpholine.

Representative examples of aliphatic aldehydes and cyclic ketones are: acetaldehyde, propionaldehyde, n- and isobutyraldehyde, cyclopentanone, trimethylcyclopentanone, cyclohexanone, trimethylcyclohexanone and others.

The preparation of suitable enamines and polyenamines is well known and is describe, for example, in

*Makromolekulare Chemistry* No. 108, 1967, page 1 and following.

Furthermore, cyclic Schiff bases are suitable as component A in the preparation of the internal mold release agent. The preparation of such compounds is, for example, described in *Journal of Chemical Society* (London), 1964, pages 2445 and following and in *Chemical Reports* 91, 1958, pages 1133 and following. Preferred cyclic Schiff bases are: 2-methylΔ-piperidine and/or 3,4-dihydroisoquinoline.

The ketimines, aldimines, enamines, and cyclic Schiff bases used according to the process of this invention for the preparation of the internal mold release agents can be used individually or as mixtures of at least two of said compounds from the same or from different compound classes. Excellent results have been achieved when using aldimines from aliphatic aldehydes, for example isobutyraldehyde, and ketimines from ketones having aliphatic and cycloaliphatic groups, for example methylisobutylketone, cyclopentanone and cyclohexanone, as well as and preferably with enolizable aldimines and most preferably ketimines which have in bonded form an enolizable hydrogen atom.

In place of the aforesaid ketimines, aldimines, or enamines, the internal mold release agents can also contain compounds having mixed structures such as ketimine-enamine groups, aldimine-enamine groups or ketimine-enamine-aldimine groups as component (A). Such compounds are well known and are prepared following conventional methods. They differ from the above described components (A) only by the type and amount of amine, aldehyde or ketone used as the starting material.

Compounds containing mixed ketimine and enamine groups or aldimine and enamine groups are prepared, for example, by the reaction of amines, which contain in bonded form primary and secondary amino groups, like 1-(aminoalkyl)piperazines, for example 1-(2-aminoethyl)-piperazine or aminoalkylalkanolamines, such as aminoethylethanolamine with cyclic ketones, for example cyclohexanone and/or aldehydes, preferably aliphatic aldehydes, for example N-butyraldehyde or isobutyraldehyde. Compounds having a ketimine-enamine-aldimine structure, likewise are prepared by reacting polyamines having primary and secondary amino groups with mixtures comprised of cycloaliphatic ketones and/or other ketones suitable for ketimine preparation and aliphatic or aromatic aldehydes. The amount of ketone and aldehyde used, of course, must correlate with one another so that in addition to both ketimine and aldimine formation, enamine formation occurs.

The ketimines, aldimines, enamines and/or cyclic Schiff bases suitable as starting components A, can in addition contain in dissolved form in quantities up to 20 percent, preferably from 5 to 15 weight percent based on the weight of ketimines, aldimines, enamines and/or cyclic Schiff bases, of oligourethanes and/or oligoureas having molecular weights of from 151 to 700, preferably of from 200 to 600 and having melting points of from 30° to 280° C., preferably of from 70° to 250° C. For the preparation of such oligourethanes or oligoureas, organic polyisocyanates, or free polymers, containing isocyanate groups from polyoxyalkylenepolyols, preferably polyoxyethylene-, polyoxypropylene- or polyoxypropylenepolyoxyethylene- polyols and organic, preferably aromatic, polyisocyanates, are reacted with primary and/or secondary mono- and/or polyamines, and/or linear aliphatic and/or heterocyclic alkanolamines in the presence of inert solvents, such as, for example, monochlorobenzene, toluene, xylene, methylene chloride, trichloroethylene or cyclohexane.

Organic carboxylic acids are used in the preparation of the metal salts (B), preferably organic monocarboxylic acids, having from 8 to 24 carbon atoms, preferably from 16 to 20 carbon atoms, such as lauric acid, palmitic acid, oleic acid, isostearic acid and preferably stearic acid. Preferred are the commercially available stearic acids, which, without noticeably impairing the release effect, contain up to 10 weight percent, preferably up to 5 weight percent, of other optionally unsaturated carboxylic acids having more than 8 carbon atoms.

Metals from groups IA, IB, IIA or IIB of the periodic table are suitable for the formation of metal salts B (according to *The Handbook of Chemistry and Physics*, published by the Chemical Rubber Company, for example the 63rd Edition, 1982); as well as aluminum, chromium, molbydenum, iron, cobalt, nickel, tin, lead, antimony or bismuth. Preferably used are alkali metals, particularly sodium and potassium, alkaline earth metals, particularly magnesium and calcium, as well as, and most preferred, the metal zinc.

Metal salts of isostearic acid and/or stearic acid are preferably used as metal salts (B), and preferred are zinc stearate, zinc isostearate, calcium stearate, and sodium stearate or a mixture of at least two of said stearates. Most preferred is a mixture comprised of zinc stearate and/or zinc isostearate, calcium stearate and sodium stearate.

Although mixtures of starting components (A) and (B) demonstrate an excellent effect as internal mold release agents in the preparation of molded articles, in the preparation of the mold release agent of this invention, preferably coemployed in addition are organic carboxylic acids, organic sulphonic acids, mineral acids or amidosulphonic acids. Preferably used are monocarboxylic acids having from 1 to 20 carbon atoms, more preferably from 5 to 18 carbon atoms; aliphatic dicarboxylic acids having from 2 to 36 carbon atoms, more preferably 2 to 12 carbon atoms; aromatic monocarboxylic acids, having from 7 to 12 carbon atoms, more preferably 7 to 10 carbon atoms; and/or aromatic dicarboxylic acids having from 8 to 17 carbon atoms, more preferably from 8 to 10 carbon atoms, which optionally contain in bonded form olefinic unsaturated units and/or radicals reactive with isocyanate groups, such as hydroxyl groups, amino groups or alkyl amino groups. In place of the mono- and/or dicarboxylic acids or in a mixture with them the corresponding carboxylic acid anhydrides can also be used. Individual examples of aliphatic monocarboxylic acids are formic acid, acetic acid, propionic acid, isovaleric acid, caproic acid, capric acid, lauric acid, myristic acid, palmitic acid, stearic acid, ricinoleic acid, arachidic acid, hydroxyl stearic acid, isostearic acid, and oleic acid. Aliphatic dicarboxylic acids include for example oxalic acid, succinic acid, glutaric acid, adipic acid, pimelic acid, suberic acid, sebacic acid, undecanic acid, dodecanoic acid, dimerized and trimerized fatty acids, maleic acid and fumaric acid; and aromatic mono- and/or dicarboxylic acids, include benzoic acid, the toluylic acids, hydroxyl benzoic acids, aminobenzoic acids, phthalic acids, isophthalic acid and terephthalic acid. The following mono- and dicarboxylic acids as well as the corresponding carboxylic anhydrides are preferably used: stearic acid, oxalic acid, adipic acid, benzoic acid, and benzoic anhydride. The mono-and/or dicarboxylic acids and their anhydrides can be used individually or as mixtures.

In addition, polyester polyols and/or phthalic monoalkyl esters are also suitable as carboxylic acids, having acid numbers of from 40 to 300, preferably of from 50 to 250 and soluble polymers in the starting components for the preparation of molded articles, having molecular weights of from 600 to 1500 and acid numbers of from 150 to 300, preferably of from 200 to 280, prepared by the copolymerization of acrylic acid and n-butylacrylate, 2-hydroxyethylacrylate and/or styrene.

Further, organic sulfonic acids, preferably aryl sulphonic acids, can be used as starting component (C), of said internal mold release agents for example p-toluene sulphonic acid, o-toluene sulphonic acid, as well as mixtures thereof, benzenesulphonic acid, mixtures of p-toluenesulphonic acid and xylenesulphonic acid and the adduct from p-toluenesulphonic acid and butylene oxide, mineral acids such as sulphuric acid, phosphoric acid or polyphosphoric acid and amidosulphonic acid.

In preparing said internal mold release agents, starting components A, B and optionally C can be mixed together at the same time or one after another while stirring at temperatues of from 20° to 150° C., more preferably of from 40° to 130° C. and most preferaby of from 40° to 100° C. After cooling the mixture, the resulting products are storage stable.

The internal mold release agents are used for the preparation of noncellular or cellular molded articles or molded articles having a cellular core and a dense skin, so called integral skin foams, using the polyisocyanate addition polymerization process. The internal mold release agents are incorporated into the starting components in the molten state at temperatures of from 20° to 120° C., preferaby of from 30° to 90° C., preferably into the compounds having reactive hydrogen atoms, in the preparation of the molded articles.

The cellular or noncellular molded articles, or molded articles having a cellular core and a dense peripheral zone having improved demolding properties, consist of polyurethane plastics, polyurea-plastics, polyurethane-polyurea plastics, polyurethane-polyurea-polyamide plastics or polyurea-polyamide plastics, are prepared using the polyisocyanate addition polymerization process by the reaction of (a) an organic polyisocyanate;
(b) a higher molecular weight compound having at least two reactive hydrogen atoms; and
(c) chain extending agents and/or crosslinkers;
in the presence of
(e) from 0.1 to 15 parts by weight, preferably from 2 to 10 parts by weight based on 100 parts by weight of starting components b and c of an internal mold release agent described herein
(f) catalysts; and optionally in the presence of
(g) blowing agents; and
(h) auxiliaries and/or additives using the prepolymer process or preferably using the one-shot process with the help of low pressure technology or most preferably using reaction injection molding technology (RIM) in open or preferably closed molds where said molds are made from plastics, for example epoxide resins and/or unsaturated polyester resins, or preferably made from metal materials. The formulations may also be processed using a pour-in-place process.

The preparation of molded articles using the polyisocyanate addition polymerization process with the help of the aforesaid technologies is well known. The preferred one-shot process with the help of reaction injection molding technology is for example described by Piechota and Roehr in *Integral Skin . Foams*, Carl-Hanser Publishers, Munich, in Vienna, 1975; D. J. Prepelka and J. L. Wharton in *Journal of Cellular Plastics*, March/April, 1975, pages 87–98 and U. Knipp in *Journal of Cellular Plastics*, March/April, 1973, pages 76–84.

Following the above described methods, the preparation of optionally cellular molded articles results from polyurethane-elastomers, for example as described in the previously cited monograph *Integral Skin Foams*; from polyurea-elastomers disclosed in European Patent Applications Nos. 81 701; 93 861 (U.S. Pat. No. 4,396,729); 92 672, 93 862 (U.S. Pat. Nos. 4,444,910 and 4,433,067); and 93 334; from polyurethane-polyurea-elastomers cited in Federal Republic of Germany No. 26 22 951 (U.S. Pat. No. 4,218,543) and in European Patent Applications Nos. 26 915; 69 286 and 93 336; and from polyurethane-polyurea-polyamide elastomers and polyurea-polyamide-elastomers in U.S. Pat. No. 4,552,943.

The noncellular molded articles prepared according to the process of this invention have a density of from 0.9 to 1.4 g/cm$^3$, preferaby of from 1.0 to 1.2 g/cm$^3$; the cellular molded articles have a density of from 0.3 to 1.1 g/cm$^3$, preferably from 0.8 to 1.0 g/cm$^3$; and the molded articles having a cellular core and a dense peripheral zone have an overall density of from 0.05 to 1.2 g/cm$^3$; where the resulting flexible molded articles have a density of preferably from 0.2 to 0.7 g/cm$^3$, and most preferably of from 0.35 to 0.7 g/cm$^3$; the resulting semi-rigid and rigid molded articles have a density of preferably from 0.4 to 1.1 g/cm$^3$, and most preferably of from 0.7 to 1.0 g/cm$^3$.

The resulting noncellular and/or microcellular molded articles are particularly suitable for use in the automobile industry, for example as bumper coverings, impact protection moldings and body parts such as drip moldings, fenders, spoilers and wheel house extensions as well as for engineering housing components, rollers and shoe soles. Molded articles having a cellular core and a dense peripheral zone are used, for example, as shoe soles, arm rests, head rests, safety coverings in the interior of automobiles, as well as for motorcycle and bicycle seats and as coverings for composite foams.

The following examples will further illustrate this invention but are not intended to limit it in any way.

EXAMPLE 1

(a) Preparation of a ketimine from cyclohexanone and n-pentylamine

In a 4-liter, 3-neck-flask, equipped with a stirrer and a universal water separator and trap, added to a solution comprised of 705.73 grams of n-pentylamine and 2000 ml of toluene was 873.66 grams of cyclohexanone. The reaction mixture was heated in an oil-bath to a bath temperature of 140° C. and at this temperature within 2 hours, 147 grams of water was separated. Subsequently, the toluene was distilled off and the resulting ketimine was distilled at 0.15 mbar and at 99° C. The yield of ketimine was 1100 grams.

(b) Preparation of internal mold release agent I

While stirring at room temperture, 282.4 grams of oleic acid was added to 489.76 grams of the ketimine from cyclohexanone and n-pentylamine prepared according to Example 1a. The mixture was heated to 100° C. and stirred for 1 hour at this temperature. Following the addition of 772.32 grams of zinc stearate, 27.76 grams of sodium stearate and 27.76 grams of calcium stearate, the mixture was stirred at 120° C. in order to achieve a clear solution. The mixture was allowed to cool to room temperature.

EXAMPLES 2-8

(a) Preparation of the ketimines

Ketimines were prepared by substantially following the procedures described in Example 1a using the starting materials and quantities set forth in Table I.

(b) Preparation of the internal mold release agents

The internal mold release agents were prepared by substantially following the procedures described in Example 1b using the following ingredients and quantities:

489.7 g of ketimine obtained, in step (a) (See Table II)
282.4 g oleic acid,
772.76 g zinc stearate,
27.76 g sodium stearate, and
27.76 g calcium stearate.

TABLE 1

| Example | Ketone Quantity (g) | Ketone Type | Amine Quantity (g) | Amine Type | Amount of Water Separated |
|---|---|---|---|---|---|
| 2* | 774.21 | cyclohexanone | 725.79 | n-hexylamine | 129 |
| 3* | 682.8 | cyclohexanone | 817.20 | n-octylamine | 160 |
| 4* | 1606 | 4-methyl-2-pentanone | 700 | pentylamine | 160 |
| 5 | 931 | cyclohexanone | 1163 | 6-methyl-2-heptylamine | 162 |
| 6 | 513.68 | cyclohexanone | 486.32 | dimethylaminopropylamine | 90 |
| 7 | 1600 | 4-methyl-2-pentanone | 796.7 | methylaminopropylamine | 162 |
| 8** | 957.9 | cyclohexanone | 542.1 | 2,4-toluylenediamine | 160 |

*The excess cyclohexanone or 4-methyl-2-pentanone and optionally toluene were distilled off at 0.2 mbar.
**The residue was used in the preparation of internal mold release agent VIII without any further purification.

TABLE 2

| Example | Solvent Quantity (g) | Solvent Type | Ketimine | Boiling Point °C./mbar | Mold Release Agent |
|---|---|---|---|---|---|
| 2* | 2000 | toluene | 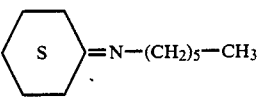 | 99-104/0.1-0.15 | II |
| 3* | 2000 | toluene | 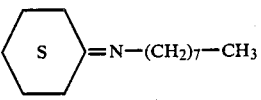 | 128/0.2 | III |
| 4* | — | — | 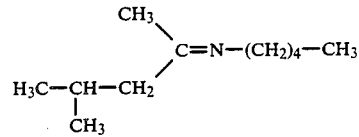 | 60/0.2 | IV |
| 5 | 2000 | toluene | 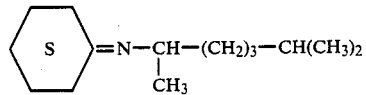 | 100/0.1-0.2 | V |
| 6 | 2000 | toluene | 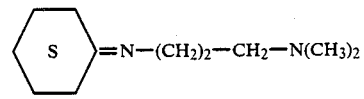 | 88-93/0.3 | VI |
| 7 | — | — | 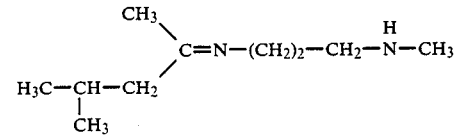 | 60/0.4 | VII |

TABLE 2-continued

| Example | Solvent Quantity (g) | Type | Ketimine | Boiling Point °C./mbar | Mold Release Agent |
|---|---|---|---|---|---|
| 8** | — | | 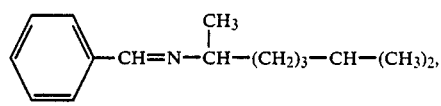 | — | VIII |

*The excess cyclohexanone or 4-methyl-2-pentanone and optionally toluene were distilled off at 0.2 mbar.
**The residue was used in the preparation of internal mold release agent VIII without any further purification.

EXAMPLE 9

(a) Preparation of an aldimine from benzaldehyde and n-butylamine

In a 4-liter, 3-neck-flask, equipped with a stirrer and a universal water separator and trap, added to a solution comprised of 885 grams of n-butylamine and 1500 grams of toluene, within 20 minutes was 934 grams of benzaldehyde; the reaction temperature increased by about 70° C. The reaction mixture was heated in an oil-bath to a bath temperature of from 120° to 150° C., and at this temperature 146 grams of water was separated in 4 hours. The toluene was distilled off, first at normal pressure and then under reduced pressure in an oil-bath at a bath temperature of from 150° to 170° C. The aldimine obtained had a boiling point of 105° C. at 0.2 mbar.

(b) Preparation of internal mold release agent IX

While stirring at room temperature, 282.40 grams of oleic acid was added to 489.76 grams of n-butyl-benzaldimine prepared according to Example 9a. The mixture was heated to 100° C. and stirred for 1 hour at this temperature. Following the addition of 772.32 grams of zinc stearate, 27.76 grams of sodium stearate and 27.76 grams of calcium stearate, the mixture was stirred at 120° C. in order to achieve a clear solutction. The internal mold release agent was cooled to room temperature.

EXAMPLE 10

(a) Preparation of an aldimine from benzaldehyde and 6-methyl-2-heptane amine.

In a 4-liter, 3-neck-flask, equipped with a stirrer and a universal water separator and trap, added to a solution comprised of 90.4 grams of 6-methyl-2-amino heptane and 1200 grams of toluene, within 20 minutes, was 817.1 grams of benzaldehyde; the reaction temperature increased by about 60° C. The reaction mixture was heated in an oil bath to a bath temperature of from 120° to 150° C., and at this temperature 130 grams of water separated in 3 hours. The toluene was first distilled off at normal pressure and subsequently under reduced pressure in an oil bath at a bath temperature of from 150° to 170° C. The aldimine obtained had a boiling point of 97° to 105° C. at 0.05 mbar.

(b) Preparation of internal mold release agent X

By substantially following the procedures of Example 9b the following were mixed together:
489.76 g

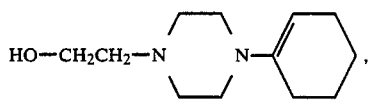

(aldimine from Example 10a),
282.40 g oleic acid,
772.32 g zinc stearate
27.76 g sodium stearate, and
27.76 g calcium stearate.

EXAMPLE 11

(a) Preparation of an enamine from cyclohexanone and 1-(2-hydroxylethyl)-piperazine In a 4-liter, 3-neck-flask, equipped with a stirrer and a universal water separator and trap, 1094 grams of 1-(2-hydroxylethyl)-piperazine was dissolved in 1500 grams of toluene and mixed together with 882 grams of cyclohexanone. The mixture was heated in an oil-bath to a bath temperature of from 140° to 150° C., and at this temperature within 30 hours, 151 grams of water separated out. The toluene remaining behind was distilled off under reduced pressure. 1287 grams of an enamine was obtained having a boiling point of 141° C. at 0.35 mbar.

(b) Preparation of internal mold release agent XI

By substantially following the procedures of Example 9b, the following were mixed together:
489.76 g HO—CH$_2$CH$_2$—N⟨ ⟩N—⟨cyclohexyl⟩, (enamine from Example 11a),
282.40 g oleic acid,
772.32 g zinc stearate,
27.76 g sodium stearate, and
27.76 g calcium stearate

EXAMPLE 12

(a) Preparation of an aldimine from a trifunctional polyoxyalkylene-polyamine having a molecular weight of 440, (Jeffamine ® T 403 from the Texaco Company) and pivalaldehyde In a 4-liter, 3-neck-flask, equipped with a stirrer and a universal water separator and trap, 800 grams of polyoxyalkylene-triamine having a molecular weight of 440 (Jeffamine ® T 403), 1500 grams of toluene and 378 grams of pivalaldehyde were mixed together. The mixture was heated in an oil bath to a bath temperature of 140° C., and at this temperature within 10 hours 65 grams of water separated out. The toluene remaining behind was distilled off under reduced pressure. Obtained was 1040 grams of aldimine, which was used in the preparation of the internal mold release agent without any further purification.

(b) Preparation of internal mold release agent XII

By substantially following the procedures of Example 9b, the following were mixed together:
489.76 g of an aldimine according to Example 12a,
282.40 g oleic acid,
772.32 g zinc stearate,
27.76 g sodium stearate, and
27.76 g calcium stearate

EXAMPLE 13

(a) Preparation of a mixed ketimine-enamine from a polyoxyalkylene amine having a molecular weight of 5000 with terminally positioned primary and secondary amino groups (Jeffamine ® T 5000 from the Texaco Company) and cyclohexanone By substantially following the procedures of Example 12a the following were mixed together:
632.0 g polyoxyalkylene-polyamine having an amine number of 29 (Jeffamine ® T 5000),
2000 g toluene, and
40 g cyclohexanone The mixture was heated in an oil-bath to a bath temperature of from 140° to 150° C., and at this temperature 5.5 grams of water separated out in 24 hours. The toluene remaining behind and the excess cyclohexanone were distilled off under reduced pressure (0.5 mbar). Obtained was 641 grams of a ketimine-enamine compound, which was used for the preparation of the internal mold release agent without any further purification.

(b) Preparation of internal mold release agent XIII

By substantially following the procedures of Example 9b the following were mixed together:
489.76 g of the ketimine-enamine according to Example 13a,
282.40 g oleic acid,
772.32 g zinc stearate,
27.76 g sodium stearate, and
27.76 g calcium stearate.

EXAMPLE 14

(a) Preparation of a ketimine from acetophenone and n-pentylamine

By substantially following the procedures of Example 12a, 596.2 grams of n-pentylamine, 2000 grams of toluene and 903.8 grams of acetophenone were mixed together. The mixture was heated in an oil-bath to a bath temperature of 140° C. and at this temperature 130 grams of water separated out in 12 hours. Following this, the toluene was distilled off under normal pressure. Obtained was a ketimine having a boiling point of from 85° to 95° C. at 0.2 mbar.

(b) Preparation of internal mold release agent XIV

By substantially following the procedures of Example 9b the following were mixed together:
489.76 g

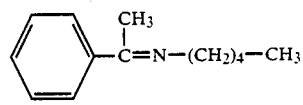

(Ketimine from Example 14a)
282.40 g oleic acid,
772.32 g zinc stearate,
27.76 g sodium stearate, and
27.76 g calcium stearate.

EXAMPLE 15

(a) Preparation of a ketimine from aniline and methylisobutyl-ketone.

In a 4-liter, 3-neck-flask, equipped with a stirrer and a universal water separator and trap, 700 grams of aniline and 2000 grams of 4-methyl-2-pentanone were condensed in the presence of 0.1 gram of toluenesulphonic acid at 140° C. in 12 hours time and 135 grams of water was separated out. Following this the excess 4-methyl-2-pentanone was distilled off at normal pressure. Obtained was a ketimine having a boiling point of 80° C. at from 0.1 to 0.01 mbar.

(b) Preparation of internal mold release agent XV

By substantially following the procedures of Example 9b the following were mixed together:
489.76 g

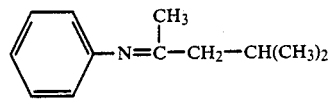

(Ketimine from Example 15a)
282.40 g oleic acid,
772,32 g zinc stearate,
27.76 g sodium stearate, and
27.76 g calcium stearate.

EXAMPLE 16

(a) Preparation of an aldimine from iso-butyraldehyde and n-hexylamine

In a 4-liter, 3-neck-flask, equipped with a stirrer and a universal water separator and trap, added dropwise to 840.91 grams of n-hexylamine at room temperature within 1 hour was 778.93 grams of iso-butyraldehyde. In so doing the temperature increased by 50° C. The mixture was heated in an oil-bath to a bath temperature of from 120° to 130° C., and at this temperature 150 grams of water was separated out. Following this, the excess iso-butyraldehyde was distilled off under reduced pressure. The resulting aldimine, whose structure was confirmed by $^1$H-NMR-Spectroscopy, was used in the preparation of the internal mold release agent without any further purification.

(b) Preparation of internal mold release agent XVI

By substantially following the procedures of Example 9b, the following were mixed together:
489.8 g $(H_3C)_2-CH-CH=N-(CH_2)_5-CH_3$, (aldimine from Example 16a)
282.40 g oleic acid,
27.76 g sodium stearate, and
27.77 g calcium stearate.

EXAMPLE 17

(a) Preparation of a ketimine-enamine-mixture by the reaction of a mixture comprised of aminoethylethanolamine, 1-(2-hydroxylethyl)-piperazine, 1-(2-aminoethyl)-piperazine and dipropylenetriamine with cyclohexanone In a 4-liter, 3-neck-flask, equipped with a stirrer and a universal water separator and trap,
244.46 g aminoethylethanolamine,
55.70 g 1-(2-hydroxylethyl)-piperazine,
100.30 g 1-(2-aminoethyl)-piperazine,
25 g dipropylenetriamine,
1600 g toluene, and
600 g cyclohexanone were mixed together in the sequence set forth. The mixture was heated in an oil-bath to a bath temperature of 140° C., and at this temperature 92 grams of water separated out in 12 hours. Then, the toluene and the excess cyclohexanone were distilled off at 100° C. and at 0.1 mbar. Obtained was a ketimine-enamine-mixture which was used in the preparation of internal mold release agent XVII without any further purification.

(b) Preparation of internal mold release agent XVII

By substantially following the procedures of Example 9b, the following were mixed together:

489.76 g of the ketimine-enamine-mixture according to Example 17a,
282.40 g oleic acid,
772.32 g zinc stearate,
27.76 g sodium stearate, and
27.76 g calcium stearate.

EXAMPLE 18

(a) Preparation of oligourethanes and oligoureas

In a 1-liter, 3-neck-flask, equipped with a stirrer and a universal water separator and trap, at room temperature within 1.5 hours the amine was added to a mixture comprised of 500 grams of monochlorobenzene and 100 grams of a 4,4'-diphenylmethane-diisocyanate mixture, modified with polyoxypropylene glycol, containing carbodiimide groups, having an NCO content of 26.5 weight percent.

The precipitate which formed was then filtered off, washed with monochlorobenzene and dried.

The type and amount of amine used, and the melting points of the final products are all presented in Table 3.

TABLE 3

| Example | Amine Quantity (g) | Type | Melting Point °C. |
|---|---|---|---|
| 18a 1 | 25.4 | aminoethylethanolamine | 169–204 |
| 18a 2 | 42.02 | 1-(2-aminoethyl)-piperazine | 182–210 |
| 18a 3 | 63.54 | 1-(2-hydroxylethyl)-piperazine | 87–109 |
| 18a 4 | 25.6 | dipropylenetriamine | 234 (while decomposing) |
| 18a 5 | 35.7 | n-butylamine | 223 (while decomposing) |

(b) Preparation of internal mold release agent XVIII

To 440.78 grams of n-pentyl-cyclohexanonimine, prepared from cyclohexanone and n-pentylamine by substantially following the procedures of Example 1a, while stirring at 100° C., the following were added:
23.94 g reaction product according to Example 18a1,
9.82 g reaction product according to Example 18a2,
5.46 g reaction product according to Example 18a3,
2.45 g reaction product according to Example 18a4, and
7.31 g reaction product according to Example 18a5.

The mixture was stirred at 140° C. until a clear solution resulted. The solution was allowed to cool down to 120° C., then 282.4 grams of oleic acid was added and the mixture was stirred for 1 hour. Subsequently, while stirring at 120° C., the following were added: 772.32 grams of zinc stearate, 27.76 grams of sodium stearate, and 27.76 grams of calcium stearate, and then the mixture was stirred at 120° C. until a clear solution had resulted. The internal mold release agent was allowed to cool to room temperature.

EXAMPLE 19

Preparation of internal mold release agent XIX

By substantially following the procedures of Example 9b, the following were mixed together:
600.96 g ketimine according to Example 4a,
171.20 g mixture comprised of p-toluenesulphonic and xylenesulphonic acid (TX-acid from the Witco Chemicals Corp.),
772.32 g zinc stearate,
27.76 g calcium stearate, and
27.76 g sodium stearate.

EXAMPLE 20

Preparation of internal mold release agent XX

While stirring at 120° C., 772.32 grams of zinc stearate, 27.76 grams of calcium stearate, and 27.76 grams of sodium stearate were added to 772.16 grams of n-pentyl-cyclohexanonimine, prepared from cyclohexanone and n-pentylamine according to the procedures of Example 1a. The mixture was stirred at 120° C. in order to obtain a clear solution. Subsequently, it was allowed to cool to room temperature.

EXAMPLES 21–40

Preparation of the polyurethane-polyurea-molded articles

B Stream: A mixture comprised of:
75.45 parts by weight of a polyoxypropylene- (80 weight percent) polyoxyethylene (20 weight percent)-triol having a hydroxyl number of 26, prepared by the addition polymerization of 1,2-propylene oxide on trimethylolpropane and the subsequent addition polymerization of ethylene oxide on the resulting trimethylolpropanepolyoxypropylene-adduct,
20.00 parts by weight of 3,5-diethyl-toluylene-2,4-diamine,
0.33 parts by weight of 1,4-diazabicyclo-(2,2,2)octane,
0.22 parts by weight of dibutyltin-dilaurate, and
4 parts by weight of one of the internal mold release agents I-XX prepared according to Examples 1-20.

A Stream:
A mixture comprised of 4,4'-diphenylmethane-diisocyanate, modified with polyoxypropylene glycol, containing carbodiimide groups, having an NCO content of 26.5 weight percent.

The A Stream and B Stream components were heated to 50° C., in a weight ratio of (B):(A) equaling 100:48.7 parts by weight, they were mixed together using a reaction injection molding process on a high pressure proportioning machine of the type Puromat ® 30 from the Elastogran-Machienbau, and then processed into molded articles using an aluminum mold heated to 60°-70° C. having the shape of an automobile door side molding with the mold having the dimensions of about 2×1000×10 mm.

Before beginning preparation of the molded articles, the mold was treated once with an external release wax of the type Fluoricon ® 36/134/2 from the Acmos Company. The shot time was about 1 second and the mold time was 45 seconds.

Regarding the magnitude of possible demoldings, a number was established up to which a molded article was able to be demolded problem-free from the mold during opening, without having bonding and/or distortion occurr because of the large adhesion strength of the molded article to the under surface of the mold.

When a molded article was able to be demolded problem-free at least 20 times, the experimental series was normally terminated.

The results obtained are summarized in Table 4.

TABLE 4

| Example | Internal Mold Release Agent | Number of Demoldings |
|---|---|---|
| 21 | I | far more than 20 |
| 22 | II | far more than 20 |
| 23 | III | 20 |
| 24 | IV | far more than 20 |
| 25 | V | 20 |
| 26 | VI | far more than 20 |
| 27 | VII | 20 |
| 28 | VIII | 15 |
| 29 | IX | 20 |
| 30 | X | 15 |
| 31 | XI | 20 |
| 32 | XII | 3 |
| 33 | XIII | 20 |
| 34 | XIV | 12 |
| 35 | XV | 12 |
| 36 | XVI | 20 |
| 37 | XVII | far more than 20 |
| 38 | XVIII | far more than 20 |
| 39 | XIX | 15 |
| 40 | XX | far more than 20 |

EXAMPLE 41

Preparation of an elastic polyurea-molded article

B Stream: A mixture comprised of:
  72.67 parts by weight of a polyoxypropylene-diamine, having an amine number of 44 (Jeffamine ® D 2000 from the Texaco Company),
  23.00 parts by weight of 3,5-diethyl-toluylene-2,4-diamine,
  0.33 parts by weight of 1,4-diazabicyclo-(2,2,2)octane, and
  4.0 parts by weight of internal mold release agent I.

A Stream:
  A mixture comprised of 4,4'-diphenylmethane-diisocyanate, modified with polyoxypropylene-glycol, containing carbodiimide groups, having an NCO content of 26.5 weight percent.

The A Stream and B Stream components were heated to 50° C. and then using a high pressure proportioning machine of the type Puromat ® 30 from the Elastogran-Maschinebau, were processed into molded articles using on aluminum mold heated to 60°-70° C.; the mold had the shape of an automobile side molding and the mold had interior dimensions of about 2×100×10 mm. Before beginning preparation of the molded article series, the mold was treated once with an external release wax of the type Fluoricon ® 36/134/2 from the Acmos Company. The mixing ratio of (B):(A) was 100:52.48 parts by weight. The mold time was 45 seconds. After 20 molded articles were able to be demolded problem-free, the experimental series was terminated.

EXAMPLE 42

Preparation of a rigid polyurethane-molded article

B Stream: A mixture comprised of:
  52.75 parts by weight of a polyoxoypropylene-triol having a hydroxyl number of 875, prepared by the propoxylation of trimethylolpropane,
  6.10 parts by weight of dipropylene glycol,
  21.70 parts by weight of a polyoxypropylene-polyoxyethylene-triol having a hydroxyl number of 35, prepared by the propoxylation of glycerine and the subsequent polymerization of ethylene oxide onto the resulting glycerine-polyoxypropylene-adduct.
  0.45 parts by weight of a 50 weight percent aqueous solution of a sulfonated castor oil,
  1.50 parts by weight of a silicon oil, Stabilizer OS 710 from the Bayer Ag Company,
  1.50 parts by weight dimethylbenzylamine,
  0.2 parts by weight 1-methylimidazol,
  5.8 parts by weight trichlorofluoromethane,
  5.0 parts by weight internal mold release agent II, and
  5.0 parts by weight ricinoleic ester having a hydroxyl number of 43 and having an acid number of 0.7.

A Stream: A mixture comprised of diphenylmethane-diisocyanates and polyphenyl-polymethylene-polyisocyanates having an NCO content of 31 weight percent.

100 parts by weight of the B Stream mixture and 144 parts by weight of the A Stream mixture were mixed together at a temperature of from 25° to 28° C. on a high pressure proportioning machine using the RIM process and using a Puromat ® 50 from the Elastogran-Maschinenbau, from Strasslach near Munich, and then processed at a temperature of 50° to 55° C. in a metal mold. The shot time was 6 seconds and the mold time was 5 minutes.

The experimental series was terminated, after 20 window sections were able to be demolded problem-free without any distortion.

EXAMPLE 43

Preparation of an elastic polyurethane-molded article

B Stream: A mixture comprised of:
  73.77 parts by weight of a polyoxypropylene (80 weight percent) polyoxyethylene (20 weight percent)-triol, having a hydroxyl number of 26, prepared by the addition polymerization of 1,2-propylene oxide on trimethylolpropane and the subsequent addition polymerization of ethylene oxide on the resulting trimethylolpropane-polyoxypropylene-adduct,
  18.28 parts by weight of ethylene glycol,
  0.033 parts by weight of 1,4-diazabicylo-(2,2,2)octane,
  0.25 parts by weight of dibutyltin dilaurate, and 8.0 parts by weight of internal mold release agent IV (stirred into the B stream components in molten form).

A Stream:

112 parts by weight of a mixture comprised of 4,4'-diphenylmethane-diisocyanate, modified with polyoxypropyleneglycol, containing carbodiimide groups, having an NCO content of 27.5 weight percent.

The A Stream and B Stream components were heated to 50° C., and using a reaction injection molding process on a high pressure proportioning machine of the type Puromat® 30 from Elastogran-Maschinebau, were processed into molded articles in a steel mold heated to 50°–55° C.; the mold had the shape of a test plaque (dimension of the mold was 4×60×300 mm).

Before the beginning of the test plaque series, the mold was treated once with an external wax of the type Fluraricon® 36/134/2 from the Acmos Company. The shot time was approximately 2 seconds and the mold time was 90 seconds.

After 20 test plaques were able to be demolded problem-free, the experimental series was terminated.

EXAMPLE 44

(a) Preparation of a ketimine from a polyoxyalkylene-polyamine having an amine number of 459 (Jeffamine®D230 from the Texaco Company) and methylisobutylketone In a 6-liter, 3-neck-flask, equipped with a stirrer and a universal water separator and trap, mixed together were 978 grams of polyoxyalkylene-polyamine having an amine number of 459 (Jeffamine® D230), 200 ml of toluene and 1022 grams of 4-methyl-2-pentanone. After adding a small spatula full of p-toluenesulphonic acid, 150 ml of water separated out while heating in an oil bath at a bath temperature of 145° C. within 24 hours. Subsequently, under normal pressure about two-thirds of the remaining toluene and the residual volatile components were distilled off under a pressure of 0.8 mbar. Obtained was a ketimine as a clear, yellow liquid, which was used in the preparation of an internal mold release agent without any further purification.

(b) Preparation of internal mold release agent XXI

By substantially following the procedures of Example 9b, the following components were mixed together:
536 g of a ketimine according to Example 44a,
309 g oleic acid,
845 g zinc stearate,
30.4 g sodium stearate, and
30.4 g calcium stearate

EXAMPLE 45

(a) Preparation of a mixed ketimine from a polyoxyalkylenepolyamine having an amine number of 459 and a mixture comprised of cyclohexanone and 4-methyl-2-pentanone By substantially following the procedures of Example 44a, the following were mixed together:
1035 g of a polyoxyalkylene-polyamine having an amine number of 459 (Jeffamine® D230 from the Texaco Company),
574 g of cyclohexanone,
586 g of 4-methyl-2-pentanone, and
2000 ml of toluene.

The mixture was heated in an oil bath to a bath temperature of from 140° to 150° C., and at this temperature the water separated out in 24 hours. The remaining toluene as well as the excess cyclohexanone and 4-methyl-2-pentanone were distilled off under a pressure of 0.5 mbar.

The mixed ketimine compound, which had an amine number of 299, was used in the preparation of an internal mold release agent without any additional purification.

(b) Preparation of internal mold release agent XXII

By substantially following the procedures of Example 9b, the following components were mixed together:
536 g of a mixed ketimine according to Example 45a,
309 g oleic acid,
845 g zinc stearate,
30.4 g sodium stearate, and
30.4 g calcium stearate.

EXAMPLE 46

Preparation of internal mold release agent XXIII

By substantially following the procedures of Example 9b, except that the mixture was stirred for one hour at 140° C. and the following materials were used:
459 g of a ketimine prepared according to Example 44a,
265 g oleic acid,
367 g zinc stearate,
367 g bismuth(III)stearate,
26 g sodium stearate, and
26 g calcium stearate.

The bismuth(III)stearate used here was prepared in the following fashion:

Starting materials:
369.9 g of commercial stearic acid having an acid number of 201 from BASF AG, which had the following typical analysis:

| | |
|---|---|
| $C_{12}$ carboxylic acid | 1 weight percent |
| $C_{14}$ carboxylic acid | 3 weight percent |
| $C_{15}$ carboxylic acid | 0.5 weight percent |
| $C_{16}$ carboxylic acid | 29 weight percent |
| $C_{17}$ carboxylic acid | 1.5 weight percent |
| $C_{18}$ carboxylic acid | 64 weight percent |
| $C_{20}$ carboxylic acid | 1 weight percent | and
100.g g bismuth(III)oxide ($Bi_2O_3$).

In a 500 ml 3-neck flask, the bismuth(III)oxide was added while stirring to molten stearic acid at 70° C. The reaction mixture was then mixed for 7 hours at 110° C. The viscosity of the mixture increased and the yellow coloring dissipated, and then in an oil bath at a bath temperature of 140° C. the water which had formed was distilled off. The residue obtained was suction filtered using a filter heated to 100° C. The bismuth stearate recrystallized from cyclohexane had a melting point range of 82° to 110° C.

EXAMPLES 47–49

By substantially following the procedures described above for Examples 21–40 and using the A stream and B stream components stated below, polyurethene-polyurea molded articles are prepared and the demolding properties evaluated.

EXAMPLE 47

B Stream: A mixture comprised of:
74.65 parts by weight of a polyoxypropylene (80 weight percent)-polyoxyethylene (20 percent)-triol having a hydroxyl number of 26, prepared by the addition polymerization of 1,2-propylene oxide on trimethylolpropane and the subsequent addition polymerization of ethylene oxide on the resulting trimethylolpropanepolyoxypropylene-adduct, 20.00 parts by weight of 3,5-diethyl-toluilene-2,4-diamine, 0.35 parts by weight of dibutyltindilaurate, 1 part by weight of a solution comprised of 33 weight percent of 1,4-diazabicyclo-(2,2,2)octane, and 67 weight percent of dipropylene glycol, and 4.0 parts by weight of internal mold release agent XXI.

A Stream:

A mixture comprised of 4,4'-diphenylmethane diisocyanate, modified with polyoxypropylene-glycol, having an NCO content of 26.5 weight percent.

Using this formulation, the number of demoldings of molded articles was far more than 20.

EXAMPLE 48

Substantially the same A and B stream components are used as described in Example 47, except, in place of internal mold release agent XXI, internal mold release agent XXII was used.

The number of demoldings achieved using mold release agent XXII was far more than 20.

EXAMPLE 49

B Stream: A mixture comprised of:

75 parts by weight of a polyoxypropylene (80 weight percent)-polyoxyethylene (20 weight percent)-triol having a hydroxyl number of 26, prepared by the addition polymerization of 1,2-propylene oxide on trimethylolpropane and the subsequent addition polymerization of ethylene oxide on the resulting trimethylolpropanepolyoxypropylene-adduct, 20.00 parts by weight of 3,5-diethyl-toluilene-2,4-diamine, 1 part by weight of a solution comprised of 33 weight percent of 1,4-diazabicyclo-(2,2,2)octane, and 67 weight percent of dipropylene glycol, and 4.0 parts by weight of internal mold release agent XXIII.

A Stream:

A mixture comprised of 4,4'-diphenylmethane diisocyanate, modified with polyoxypropylene-glycol, containing carbodiimide groups, having an NCO content of 26.5 weight percent.

The experimental series was terminated after considerably more than 20 molded articles were able to be demolded problem-free.

The molded articles had a deflection temperature under load, according to ISO 75 Process B (DIN 53 461) in the unannealed state of 91° C., and following a 1-hour annealing at 140° C. or 180° C. of 148° C. and 175° C. respectively.

It should be understood that the instant specification and examples are set forth by way of illustration and not limitation, and that various modifications and changes may be made without departing from the spirit and scope of the present invention as defined by the appended claims.

We claim:

1. An internal mold release agent for the preparation of molded articles using polyisocyanate addition polymerization comprising; and (A) at least one ketimine, aldimine, enamine, cyclic Schiff base or a mixture of at least two of said compounds; and (B) at least one metal salt of an organic carboxylic acid having from 8 to 24 carbon atoms; and (C) optionally including at least one organic carboxylic acid, organic sulfonic acid, mineral acid or amidosulfonic acid.

2. The internal mold release agent of claim 1 wherein said mold release agent comprises:

(A) from 5 to 90 parts by weights of at least one of said ketimine, aldimine, enamine, cyclic Schiff base or a mixture of at least two of said compounds;

(B) from 10 to 95 parts by weight of at least one of said metal salt of an organic carboxylic acid having from 8 to 24 carbon atoms; and (C) from 0 to 50 parts by weight of at least one of said carboxylic acid, organic sulfonic acid, mineral acid, or amidosulfonic acid, based on 100 parts by weight of components (A) and (B).

3. The internal mold release agent according to claim 2 wherein said ketimines and/or aldimines (A) are prepared through the reaction of:

optionally substituted aliphatic, cycloaliphatic, heterocyclic and/or aromatic primary monoamines having from 1 to 20 carbon atoms and/or primary polyamines having from 2 to 20 carbon atoms, optionally substituted aliphatic, cycloaliphatic, heterocyclic and/or aromatic primary mono and/or polyamines, which additionally contain in bonded form secondary and/or tertiary amino groups and/or heterocyclic radicals and/or hydroxyl groups and/or ether groups, or linear, branched or cyclic alkanolamines having from 2 to 22 carbon atoms and/or polyoxyalkylene-polyamines having molecular weights from 204 to 5000, with aromatic, aliphatic-aromatic, cycloaliphatic or aliphatic ketones and/or diketones or optionally substituted aliphatic and/or aromatic aldehydes, dialdehydes and/or acetals.

4. The internal mold release agent according to claim 2 wherein said enamines and/or polyenamines (A) are prepared through the reaction of optionally substituted aliphatic, cycloaliphatic, heterocyclic and/or aromatic secondary mono and/or polyamines with aliphatic aldehydes or cycloaliphatic ketones.

5. The internal mold release agent according claim 2 wherein 2-methyl$\Delta^1$-piperidine and/or 3,4-dihydroisoquinoline are used as said cyclic Schiff base.

6. The internal mold release agent according to claim 2 wherein said aldimine or ketimine (A) has in bonded form an enolizable hydrogen atom.

7. The internal mold release agent according to claim 2 wherein the metal of said metal salts (B) belongs to group IA, IB, IIA or IIB from the periodic table, or is aluminum, chromium, molybdenum, iron, cobalt, zinc, nickel, lead, antimony or bismuth.

8. The internal mold release agent according to claim 2 wherein at least one metal salt of stearic and/or isostearic acid is used as metal salt (B).

9. The internal mold release agent according to claim 8 wherein zinc stearate, zinc isostearate, calcium stearate, sodium stearate or a mixture of at least two of said stearates is used as metal salt (B).

10. The internal mold release agent according to claim 2 wherein aliphatic monocarboxylic acids having from 1 to 20 carbon atoms, aliphatic dicarboxylic acids having from 2 to 36 carbon atoms or their anhydrides, or aromatic monocarboxylic acids having from 7 to 12 carbon atoms and/or aromatic dicarboxylic acids having from 8 to 17 carbon atoms or their anhydrides; or mixtures of said aliphatic and aromatic acids are used as organic carboxylic acids (C).

11. A non-cellular, molded article cellular molded article, or molded article having a cellular core and noncellular peripheral zone prepared by polyisocyante addition polymerization carried out in the presence of an internal mold release agent according to claim 2.

12. The article according to claim 11 wherein said polyisocyanate addition polymerization is reaction injection molding.

13. The article according to claim 12 wherein said cellular mold articles have a density of from 0.3 to 1.1 g/cm³; said molded articles having a cellular core and non-cellular peripheral zone have an overall density of from 0.05 to 1.2 g/cm³; or said non-cellular molded articles have a density of from 0.9 to 1.4 g/cm³.

14. The article according to claim 13 wherein said article is comprised of polyurethane, polyurea, polyurethane-polyurea, polyurethane-polyurea-polyamide or polyurea-polyamide plastic.

15. A process for the preparation of cellular or non-cellular molded articles or molded articles having a cellular core and non-cellular peripheral zone having improved demolding properties using polyisocyanate addition polymerization by reacting;

(a) an organic polyisocyanate;
(b) a higher molecular weight compound having at least 2 reactive hydrogen atoms;
(c) a chain extending agent and/or cross linker; in the presence of
(e) an internal mold release agent;
(f) a catalyst; and optionally in the presence of
(g) a blowing agent;
(h) auxiliaries and/or additives in open, or closed molds, wherein said internal mold release agent (e) is a mixture comprised of (A) from 5 to 90 parts by weight of at least one ketimine, aldimine, enamine, cyclic Schiff base or a mixture of at least two of said compounds,
(B) from 10 to 95 parts by weight of at least one metal salt of an organic carboxylic acid having from 8 to 24 carbon atoms; and
(C) from 0 to 50 parts by weight of at least one organic carboxylic acid, organic sulfonic acid, mineral acid or amidosulfonic acid, based on 100 parts by weight of the initial components (A) and (B).

16. The process of claim 15 wherein said polyisocyanate addition polymerization is reaction injection molding.

17. The process according to claim 16 wherein the internal mold release agent (e) is used in a quantity of from 0.1 to 15 parts by weight based on 100 parts by weight of initial components (b) and (c).

* * * * *